United States Patent Office 3,163,682
Patented Dec. 29, 1964

3,163,682
HYDROGENATION EMPLOYING SUPPORTED NICKEL AND CHROMIUM CONTAINING METALLO-ORGANIC CATALYSTS
Darrell W. Walker and Edward L. Czenkusch, Bartlesville, Okla., assignors to Phillips Petroleum Company, a corporation of Delaware
No Drawing. Filed July 13, 1961, Ser. No. 123,649
19 Claims. (Cl. 260—683.9)

This invention relates to supported biscyclopentadienyl metal catalysts in which the metal is chromium or nickel, and to hydrogenation of unsaturated hydrocarbons in contact with these catalysts. A specific aspect of the invention relates to a method of preparing such catalysts.

Biscyclopentadienyl metal compounds have become commercially available and have been designated "sandwich" compounds because of their peculiar type of metal to carbon bonding. We have discovered that biscyclopentadienyl chromium and nickel compounds, when prepared in a specific manner on certain supports, are active catalysts for the hydrogenation of unsaturated hydrocarbons.

Accordingly, it is an object of the invention to provide novel catalysts containing biscyclopentadienyl chromium and biscyclopentadienyl nickel. Another object is to provide a method of preparing active supported catalysts containing these compounds which are active for the hydrogenation of unsaturated hydrocarbons. A further object is to provide a process for hydrogenating unsaturated hydrocarbons with these novel catalysts. Other objects of the invention will become apparent to one skilled in the art upon consideration of the accompanying disclosure.

We have found that biscyclopentadienyl chromium and biscyclopentadienyl nickel deposited on porous supports in accordance with the procedures outlined hereinafter, are active catalysts for the hydrogenation of unsaturated hydrocarbons. The catalyst consists essentially of a minor portion of the chromium or nickel compound and a major portion of a porous supprt such as silica-alumina.

The supports which are effective include silica, alumina, titania, zirconia, thoria, boria, and mixtures thereof. The support is impregnated with a solution of the biscyclopentadienyl metal compound dissolved in a water-free or nonaqueous organic solvent.

Solvents which are liquids at ambient temperatures and which are sufficiently volatile to facilitate removal by evaporation are generally preferred for this use. Examples of such suitable solvents include the alkanes such as hexane, octane; cycloalkanes such as cyclopentane, cyclohexane; aromatics such as benzene, toluene; and many other liquids such as diethylether, carbon tetrachloride, and the like. Conveniently, the solution contains sufficient biscyclopentadienyl chromium or nickel compound to give upon admixture with the porous support, from about 0.01 to 20 weight percent of the organometal compound. To assure uniform impregnation, the amount of solvent is at least sufficient to saturate the solid, i.e., to completely wet the solid and fill the porous structure. Generally, the solutions contain from about 0.05 to 25 weight percent of the metal compound.

The contact between the support and the metal compound can be effected in any convenient manner. Generally, particles of the support are dispersed in a solution of the metal compound. The temperature is conveniently the ambient temperature and is not critical. Contact times from a few seconds to several hours are adequate. The catalyst is then dried, for example, by heating at temperatures below 150° F. under reduced pressure.

In these operations of preparing the catalyst as well as during subsequent handling, precautions should be taken to exclude materials which destroy or otherwise adversely affect the catalytic properties. Oxygen and water, in particular, are excluded by minimizing contact with air and by employing dry solvents.

The solid supports which are employed in the preparation of the catalyst, as described above, are porous solids of the acidic type, such as silica, silica-alumina, alumina, titania, boria, zirconia and thoria. Such supports are available as commercial products. It is preferred that the support consist of particles which pass thru a U.S. Mesh No. 10 sieve and more preferably thru a U.S. Mesh No. 100 sieve.

Prior to contact with the organometal compound, the solid support is pretreated so as to remove free water by heating at temperatures in the range of 800 to 2000° F., preferably 1000 to 1500° F., usually for a period of 0.5 to 48 hrs. in air. In some cases the solid can be heated serially with more than one gas. For example, the solid may be heated in air, then in nitrogen, then in hydrogen or carbon monoxide. After this pretreatment, the solid support is cooled and stored in a dry atmosphere. Subsequently, the support is impregnated with the cyclopentadienyl chromium or nickel compound as described above.

These catalysts may be used to hydrogenate unsaturated hydrocarbons such as ethylene, propylene, butenes, pentenes, cyclopentene, cyclohexene, butadiene, etc. to their corresponding saturated or more nearly saturated counterparts. In many cases the catalysts of this invention are useful for hydrogenation of an olefin-containing hydrocarbon stream, such as a refinery stream obtained by the fractionation of crude oil, or by fractionation of a catalytically or thermally cracked refinery product. The hydrogenation of such products provides fuels of enhanced value. Some hydrogenated fuels are valuable as jet fuels. Although this process is applied to any hydrogenatable unsaturated hydrocarbon, it is particularly applicable to $C_2$ to $C_{12}$ hydrocarbons.

The hydrogenation of olefins and olefin containing mixtures by contact with hydrogen or hydrogen-rich gas streams in the presence of these new catalysts can be effected, either continuously or batchwise. The hydrogenation may be effected either in the gas phase or in the liquid phase in the temperature range of 120–750, preferably 210–575° F., at pressures of 0–5000 p.s.i.g. Liquid phase reactions can be effected, if desired, in the presence of a diluent under conditions of temperature and pressure required to maintain the reactants in solution. Suitable diluents are inert saturated compounds which may be readily separated from the reaction products. Examples are pentanes, octanes, decanes, cyclopentane, cyclohexane, methylcyclohexane, etc. The hydrogen may be added to the reaction either continuously or intermittently to maintain the desired pressure. Reaction can be evidenced by noting the rate at which hydrogen gas is consumed and also as indicated by thermal changes which are reflected by decrease in the heat required to maintain the reaction temperature. In a batch type run the catalyst concentration will generally range from 0.02– 20 weight percent of the reaction mixture, excluding diluent, if any. In a fixed catalyst bed reaction, the vapor space velocity will generally range from 50 to 10,000.

The contact times in the reaction zones may vary over wide limits to achieve the desired degree of hydrogenation. In many applications the complete hydrogenation is attained by contact times of the order of 0.1 minute to 3 hours.

At the end of the reaction period, which effects partial or complete hydrogenation, the reaction mixture may be fractionated to recover the unreacted constituents and separate the catalyst for recycle in the process. Any convenient means may be used for this separation, although fractionation by distillation is commonly preferred.

In order to illustrate the invention, the following specific examples are presented. It is to be understood that these examples are merely illustrative and are not to be interpreted in such a manner as to unnecessarily limit the scope of the invention.

*Example I*

Commercial 87:13 silica-alumina having an average particle size of about 70 microns was activated by heating 20 hrs. at 1000° F. in air, 0.5 hr. in nitrogen, and 2 hrs. in hydrogen. A portion of this preactivated solid was dispersed in a toluene solution of about 1 g. of biscyclopentadienyl chromium in about 30 cc. toluene at about 70° F. This operation was carried out in a water-free system under a blanket of nitrogen. The toluene solvent was then removed from the slurry by vacuum distillation at no higher than room temperature. A free-flowing powder containing approximately 2 weight percent chromium (as metal) was obtained.

A 2.45 g. quantity of the above prepared catalyst was charged into a 1.4 liter stainless steel agitator equipped reactor (previously warmed and purged with dry nitrogen) with 227 g. dry cyclohexane and about 88 g. of butene-1. The hydrogenation was carried out for 2 hrs. at 280° F. and at a maximum pressure of 400 p.s.i.g. maintained by a demand flow of deoxygenated and dried hydrogen gas. At the completion of the reaction period, the contents of the reactor were removed and subjected to a fractional distillation to isolate the products.

About 88 g. of $C_4$ hydrocarbons were recovered which showed the following weight percent distribution upon analysis by vapor phase chromatography:

| | Percent |
|---|---|
| n-Butane | 14.0 |
| Butene-1 | 59.1 |
| Trans-butene-2 | 14.7 |
| Cis-butene-2 | 12.2 |

*Example II*

Commercial 87:13 silica-alumina having an average particle size of about 70 microns was activated by heating 20 hrs. at 1000° F. in air, 0.5 hr. in nitrogen, and 2 hrs. in hydrogen. A 14.13 g. quantity of the preactivated solid was dispersed in 30 cc. of a clear green toluene solution containing 0.9431 g. biscyclopentadienyl nickel at 70° F. This operation was carried out in a water-free system under a blanket of nitrogen. The toluene solvent was then removed from the slurry by vacuum distillation at no higher than room temperature. A brown-red free-flowing powder containing approximately 2 weight percent nickel (as metal) was obtained.

A 2.86 g. portion of the above prepared catalyst was charged into a previously warmed and nitrogen purged 1.4 liter stainless steel agitator equipped reactor together with 227 g. cyclohexane and about 102 g. butene-1. The reactor was sealed and maintained for 1 hr. at 280° F. and at pressures up to 400 p.s.i.g. by a demand flow of hydrogen gas. The hydrogen gas was previously deoxygenated and dehydrated over palladium-alumina, and alumina respectively. At the completion of the reaction the contents of the reactor were transferred to a distillation column which fractionally separated 102 g. of $C_4$ hydrocarbon of which 99.2 weight percent was n-butane, as determined by vapor phase chromatography.

Certain modifications of the invention will become apparent to those skilled in the art and the illustrative details disclosed are not to be construed as imposing unnecessary limitations on the invention.

We claim:

1. The process of hydrogenating a hydrogenatable unsaturated hydrocarbon which comprises contacting a mixture of said hydrocarbon and hydrogen under hydrogenating conditions in a non-oxidizing and water-free ambient with a catalyst formed by depositing on a dry porous support selected from the group consisting of silica, alumina, titania, zirconia, thoria, boria, and mixtures thereof, a compound selected from the group consisting of biscyclopentadienyl chromium and biscyclopentadienyl nickel so as to hydrogenate said hydrocarbon, said catalyst having been unexposed to an oxidizing and water-containing ambient and unreduced and uncalcined.

2. The process of claim 1 wherein the concentration of said compound is in the range of 0.01 to 20 weight percent of said catalyst.

3. The process of claim 1 wherein said compound is deposited on silica-alumina.

4. The process of claim 3 wherein the concentration of said compound is in the range of 0.01 to 20 weight percent.

5. The process of claim 1 wherein said hydrocarbon is dissolved in an inert liquid saturated hydrocarbon.

6. The process of claim 1 wherein said hydrogenating conditions include a temperature in the range of 150 to 750° F., a pressure in the range of 0 to 5000 p.s.i.g., and a contact time in the range of 0.1 min. to 3 hr.

7. The process of claim 6 wherein said compound is deposited on a silica-alumina support in a concentration in the range of 0.5 to 5 weight percent.

8. The process of claim 7 wherein said hydrocarbon is a $C_2$ to $C_{12}$ olefin.

9. The process of claim 1 wherein said compound is biscyclopentadienyl nickel.

10. The process of claim 1 wherein said compound is biscyclopentadienyl chromium.

11. The process of preparing a catalyst comprising contacting a dry porous particulate support selected from the group consisting of silica, alumina, titania, zirconia, thoria, boria, and mixtures thereof devoid of free water with a solution of a compound of the group biscyclopentadienyl chromium and biscyclopentadienyl nickel in an inert organic liquid so as to completely wet said support; evaporating the liquid from said support to impregnate same with said compound at a temperature below about 150° F., so as to avoid decomposition of said compound, and effecting the foregoing steps in a dry and non-oxidizing ambient.

12. The process of claim 11 wherein the concentration of said compound in said organic liquid is in the range of 0.05 to 25 weight percent and the amount of solution is selected to deposit said compound on said support in a concentration in the range of 0.01 to 20 weight percent.

13. The process of claim 11 wherein said steps are effecting under a blanket of inert gas.

14. The process of claim 11 wherein said support is activated by heating same in air at 1000 to 1500° F. for a period in the range of 0.5 to 48 hours and maintained in a dry ambient until impregnated.

15. The process of claim 14 wherein said support is heated subsequently in nitrogen and then in a gas of the group hydrogen and carbon monoxide; and the hot support is cooled and maintained in an oxygen and water-free ambient until impregnation with said solution.

16. An unreduced and uncalcined oxygen and water-free catalyst prepared by adsorbing on a dry porous support selected from the group consisting of silica, alumina, titania, zirconia, thoria, boria, and mixtures thereof devoid of free water, a minor but effective amount of at least one compound selected from the group consisting of biscyclopentadienyl chromium and biscyclopentadienyl nickel, from a solution of the selected compound in an inert substantially water-free organic solvent, and drying the resulting composite in a substantially oxygen and water-free ambient.

17. The catalyst of claim 16 containing an amount of said member in the range of 0.1 to 20 weight percent of the catalyst.

18. The catalyst of claim 17 wherein said support is silica-alumina and said compound is biscyclopentadienyl nickel.

19. The catalyst of claim 17 wherein said support is silica-alumina and said compound is biscyclopentadienyl chromium.

References Cited in the file of this patent

UNITED STATES PATENTS

| | | |
|---|---|---|
| 2,909,512 | Bruce | Oct. 20, 1959 |
| 2,953,612 | Haxton et al. | Sept. 20, 1960 |
| 2,999,075 | Pruett | Sept. 5, 1961 |
| 3,003,009 | Gurd et al. | Oct. 3, 1961 |
| 3,004,914 | White | Oct. 17, 1961 |